United States Patent
Masuda et al.

[15] 3,671,496
[45] June 20, 1972

[54] PROCESS FOR PREPARING RESINOUS COMPOSITIONS

[72] Inventors: Hiromasa Masuda, Osaka; Eiiti Nishigaki, Nishinomiya; Tomosuke Maeda, Osaka, all of Japan

[73] Assignee: Nippon Yushi Kabushiki Kaisha, Cheyoda-ku, Tokyo, Japan

[22] Filed: Sept. 8, 1970

[21] Appl. No.: 70,482

Related U.S. Application Data

[62] Division of Ser. No. 717,440, March 29, 1968, abandoned.

[30] Foreign Application Priority Data

April 3, 1967 Japan..................................42/20762

[52] U.S. Cl..........................260/77.5 CR, 260/15, 260/851
[51] Int. Cl. ........................................................C08q 22/08
[58] Field of Search..........................................260/77.5 CR

[56] References Cited

UNITED STATES PATENTS 3,245,941  4/1966  Mayer et al..........................260/31.6

*Primary Examiner*—Donald E. Czaja
*Assistant Examiner*—M. J. Welsh
*Attorney*—Waters, Roditi, Schwartz & Nissen

[57] ABSTRACT

A polyurethane composition comprising the reaction product of an acrylic polymer comprising:
Component A A monomer having 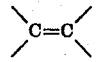

bond and further having —OH,

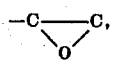

—CONH$_2$,—CONHCH$_2$OH or —CON(CH$_2$OH)$_2$ groups,
Component B A monobasic or polybasic acid having a

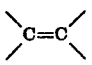

bond,
Component C
An alkyl ester of an α,β-unsaturated carboxylic acid, or a compound having a

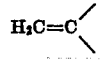

group but which is free of —OH, —COOH and ester groups, or

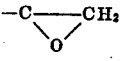

compound free of H$_2$C═C such as the glycidyl ester of versatic acid; and a diisocyanate such as xylene diisocyanate or a prepolymer thereof.

4 Claims, No Drawings

PROCESS FOR PREPARING RESINOUS COMPOSITIONS

CROSS-REFERENCE TO RELATED APPLICATIONS

This is a division of co-pending application Ser. No. 717,440; filed Mar. 29, 1968 now abandoned.

DETAILED DESCRIPTION

This invention relates to polyurethanes prepared from a resinous polymeric composition and a diisocyanate such as xylene diisocyanate or a prepolymer thereof.

Polyurethanes have heretofore been manufactured from an isocyanate or prepolymer thereof and a polymer or a prepolymer having a reactive-OH group by a reaction between the reactive-OH group and the -NCO group of the isocyanate. Metaxylene diisocyanate $$OCN-C_6H_3(CH_3)-NCO$$ (with $CH_3$ substituent)

and prepolymers thereof are desirable because they lead to driable and non-yellowing polyurethanes. However, while the diisocyanate and prepolymers are miscible with polyester resins, they are not sufficiently soluble in copoly-condensed resinous compositions, and thus they can not provide uniform films.

The object of the present invention is to provide polyurethane foams based on resinous polymeric compositions which are miscible with xylene diisocyanate $$OCN-C_6H_3(CH_3)-NCO$$

and prepolymers thereof.

Another object of the present invention is to provide useful polyurethanes which are able to provide uniform coating.

The terms copolymers and copoly-condensates as herein used means (1) acrylic, vinyl and allyl compounds, either alone or a combination of two or more such compounds, and (2) condensates of compounds (1) with amino, epoxy, and polyether compounds.

Coated films incorporating the polyurethanes according to the present invention have good resistance to chemicals, weathering and contamination, with improvements in resistance to yellowing and chalking upon outdoor exposure which have heretofore constituted major drawbacks of conventional polyurethane paints.

This invention is the reaction product of a resinous polymeric composition and a diisocyanate. The resinous polymeric composition is prepared by copoly-condensating three components A, B and C as described below, in the ratio of 0.5 – 70 percent of Component A, 0.5 – 50 percent of Component B, and $100 - (A + B)$ % of Component C, all by weight.

COMPONENT A

A compound having a $$\diagdown C=C \diagup$$

bond and further having a —OH, $$-C-C-$$
  $\diagdown O \diagup$ ,

—$CONH_2$, —$CONHCH_2OH$ or $CON(CH_2OH)_2$ groups.

COMPONENT B

An organic monobasic or polybasic acid having a $$\diagdown C=C \diagup$$

bond.

COMPONENT C

An alkyl ester of an α,β-unsaturated carboxylic acid, or a compound having a $$H_2C=C\diagup$$

group but which is free of —OH, —COOH, $$\begin{array}{c} -C(=O) \\ \phantom{-}\diagdown O, \; -CONH_2, \; -CONHCH_2OH, \; -CON(CH_2OH)_2 \\ -C(=O) \diagup \end{array}$$

and ester groups, or a $$\begin{array}{c} H \\ | \\ -C-----CH_2 \\ \phantom{-}\diagdown O \diagup \end{array}$$

compound which is free of $H_2C = C$ groups, such as the glycidyl ester of VERSATIC acid.

More particularly said Component A may be selected from the group of the following compounds:

(a) $$CH_2=C-(CH_2)_n-H$$
$$\phantom{CH_2=}|$$
$$\phantom{CH_2=}COO(CH_2)_m-CH-CH_3$$
$$\phantom{CH_2=COO(CH_2)_m-CH}|$$
$$\phantom{CH_2=COO(CH_2)_m-CH}OH$$

(wherein $n=1$ or 2, and $m=0$ or 1-10), b. Glycidyl methacrylate, or acrylate.
c. Acrylamide or methacrylamide or the methylol derivatives thereof.
d. Alkylene glycol monoacrylate or methacrylate such as ethylene glycol monoacrylate, propylene glycol monoacrylate or the corresponding methacrylates.
e. Glycol, glycerine, trimethylolethane, trimethylolpropane, pentaerythritol, polypentaerythritol or polyether or such other compound having a plurality of hydroxyl groups at least one of which is removed and the rest of the hydroxyl groups are replaced by acryl, methacryl or allyl groups.

Component B may be selected from the group of following compounds:

Monobasic acids and polybasic acids having a $$\diagdown C=C \diagup$$

bond such as acrylic acid, methacrylic acid, itaconic acid, aconitic acid, maleic acid, fumaric acid, crotonic acid, etc., and the anhydrides thereof.

Component C may be selected from the group of following compounds:

a. Alkyl esters of α,β-unsaturated carboxylic acids such as esters of alkanols having one to 18 carbon atoms, cyclohexanols, benzyl alcohols, vinyl compounds, styrenes, methyl styrenes, vinyl toluenes, acrylonitriles, methacrylonitriles, and divinyl compounds, and also cyclohexyl methacrylate, dimethyl aminoethyl methacrylate, ethylene dimethacrylate, tetrahydrofurfuryl methacrylate, ethylene glycol dimethacrylate, propylene glycol dimethacrylate.
b. $CH_2 = CH-CH_2$—type compounds such as diallyl cyanamide, allyl methacrylate, and allyl acetone.
c. Compounds having a $$-C-----C$$
$$\phantom{-}\diagdown O \diagup$$

group such as diglycidyls, glycidyl ester of VERSATIC acid (CARDURA E), triglycidyl cyanurate, tri-glycidyl isocyanurate.

CARDURA E is represented by the formula $$\begin{array}{c} R_1 \;\; O \\ | \;\;\;\; \| \\ R_2-C-C-O-CH_2-CH-----CH_2 \\ | \phantom{-C-C-O-CH_2-CH}\diagdown O \diagup \\ R_3 \end{array}$$

where $R_1$, $R_2$ and $R_3$ are saturated aliphatic radicals and have a total number of carbon atoms between seven and nine.

A mixture of the Components A, B and C as enumerated above is subjected to copoly-condensation by the use of a conventional peroxide or azo-type catalyst. A solvent and the polymerization catalyst are added to the mixture of monomers, and the whole mixture is reacted for 2 to 6 hours under reflux. The reaction is continued till the desired viscosity is attained, and then by adding a suitable amount of solvent there is prepared a product having suitable solid content.

The copolymer or copoly-condensate thus obtained is then used in the preparation of the instant polyurethanes. The copolymer or copoly-condensate is used either alone or in combination with a prepolymer thereof or in mixture with one or more epoxy resins or derivatives thereof, polyester resins modified with Cardura-E, polyether, acrylated, vinylated and allylated polyester resins, including alkyd resins and saturated or unsaturated polyesters, and amino resins such as unmodified, alcohol modified or allyl modified amino resins; unmodified melamine resins, modified melamine resins, benzoguanamine resins and urea resins. The product may also be mixed with a cellulose derivative such as cellulose acetate, cellulose acetate butyrate or nitro-cellulose.

The products according to the present invention may be compounded with any diluent or pigment before use.

The polyurethane products of the invention may be applied to objects by brushing, spraying, roller, dipping, electrostatic coating, flowing, etc. They are useful as surface coatings and protective coatings on woodworks, metals, light metals, treated steel plates, leathers and skins, artificial leathers, rubbers, plastics, fibers, papers, bricks, concrete molding, colored slates, films, cans, etc. Other useful applications include printing inks and adhesives.

This invention will now be described more fully by the following examples, wherein all parts are by weight.

EXAMPLE 1

Xylol 30 – 50 parts, methyl methacrylate 15 parts, ethyl acrylate 15 parts, ethyl hexyl acrylate 50 parts, butyl methacrylate 11 parts, 2-hydroxyethyl acrylate 5 parts, acrylic acid 4 parts and benzoyl peroxide 0.4 – 1.5 parts were reacted at a temperature between 100° C. and the boiling point of the mixture for 3 hours. A product having a viscosity of 1.5 to 8 stokes in a 50 percent solution (xylol : butyl acetate = 50 parts/50 parts) was obtained.

EXAMPLE 2

Xylol 50 parts, ethyl acrylate 29 parts, butyl acrylate 29 parts, styrene 5 parts, and 2-hydroxypropyl acrylate 26 parts, Cardura-E 10 parts, methacrylic acid 1 part and azoisobutyronitrile 0.4 – 1.5 parts were reacted in the same manner as described in Example 1, and a product having a viscosity of 1.5 to 5 stokes in a 50 percent solution was obtained.

EXAMPLE 3

Butyl acetate 30 parts, styrene 15 parts, ethyl acrylate 19 parts, butyl methacrylate 30 parts, 2-hydroxyethyl acrylate 12 parts, propylene glycol monoacrylate 10 parts, acrylic acid 10 parts and acrylamide 4 parts were reacted as described above and a product was obtained which exhibited a viscosity of 2 to 7 stokes in a 50 percent solution.

EXAMPLE 4

Xylol 30 parts, acrylonitrile 12 parts, ethyl acrylate 29 parts, methyl methacrylate 30 parts, cyclohexyl methacrylate 10 parts, 2-hydroxypropyl acrylate 10 parts, glycidyl methacrylate 1 part and maleic anhydride 4 parts were reacted in the same manner as in Example 1, and a product having a viscosity of 14 to 20 stokes in a 50 percent solution was obtained.

EXAMPLE 5

Xylol 30 parts, styrene 30 parts, trimethylol propane diallylether 10 parts, diallyl maleate 20 parts, methyl methacrylate 39.5 parts, methacrylic acid 0.5 part, and benzoyl peroxide 0.5 part were reacted for 3 to 7 hours. A product having a viscosity of 3 to 7 stokes was obtained.

EXAMPLE 6

One hundred parts of the copolymer obtained in accordance with Example 1, 20 parts of a prepolymer of xylene diisocyanate, and 20 parts of butyl acetate were mixed and the mixture was applied to a glass plate. After 20 minutes, this coating was dry to the touch and cured to a hard film in 4 hours at room temperature of 20° C. and humidity of 75 percent.

EXAMPLE 7

One hundred parts of the copolymer obtained in Example 1, 35 parts of a prepolymer of xylene diisocyanate and 20 parts of ethyl acetate were mixed and applied to a glass plate. Under the same drying conditions as above, the coated film can be dried to finger touch dryness after 30 minutes and cured hard for 5 hours.

EXAMPLE 8

One hundred parts of the copoly-condensate obtained in Example 3, 10 parts of Resimene 882 (a) butyrated melamine formaldehyde resin available from Monsanto Company), 5 parts of Epon 1001, a condensation product of epichlorohydrin and bisphenol-A (Shell Chemical Co.) and 30 parts of a prepolymer were mixed and applied to a glass plate. The coated film can be dried to finger touch dryness in 30 minutes and cured hard in 5 hours.

EXAMPLE 9

Thirty parts of titanium dioxide, 50 parts of the reaction product of Example 1, and 20 parts of a prepolymer of xylene diisocyanate were mixed and the mixture was applied to a glass plate. The coated film had a gloss of 95 and a pencil hardness of 2H.

EXAMPLE 10

Forty parts of the copolymer obtained in Example 3, 20 parts of ½ inch cellulose acetate butyrate, 10 parts of xylene diisocyanate prepolymer, and 30 parts of titanium dioxide were mixed, and with the addition of a suitable amount of solvent, the whole mixture was applied to a glass plate. A good coated film having a pencil hardness of 2H and a high gloss was formed.

EXAMPLE 11

Fifty-five parts of the copolymer obtained in Example 4, 10 parts of 1/10 inch cellulose acetate butyrate, 7 parts of xylene diisocyanate, 5 parts of butyrated melamine resin, and 23 parts of titanium dioxide were mixed, and with the addition of a suitable amount of solvent, the whole mixture was applied to a glass plate. A high gloss coated film having a pencil hardness of 2H was obtained.

We claim:

1. A polyurethane composition which comprises (a) an acrylic polymer prepared from A. a monomer having a

bond and at least one group selected from —OH,

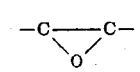

—$CONH_2$, —$CONHCH_2OH$ and —$CON(CH_2OH)_2$,

B. an organic acid selected from the group consisting of monobasic and polybasic acids having a

bond and anhydrides thereof

C. a co-condensable monomer selected from the group consisting of compounds which contain a

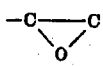

group and are free of

groups; alkyl esters of $\alpha,\beta$-unsaturated acids; and compounds which contain a

group and are free of —OH, —COOH,

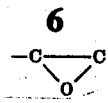

—$CONH_2$, —$CONHCH_2OH$, —$CON(CH_2OH)_2$ or ester groups in a ratio which is in the range of A = 0.5 to 70 percent by weight
B = 0.5 to 60 percent by weight and
C = 100 − (A + B) percent by weight and b. a diisocyanate selected from the group consisting of xylene diisocyanate and prepolymers thereof.

2. A composition as in claim 1 wherein A is 2-hydroxy ethyl acrylate, B is acrylic acid and C is a mixture of methyl methacrylate, ethyl acrylate, ethyl hexyl acrylate and butyl methacrylate.

3. A composition as in claim 1 wherein A is a mixture of acrylamide, propylene glycol monoacrylate and 2-hydroxyethyl acrylate, B is acrylic acid and C is a mixture of styrene, ethyl acrylate and butyl methacrylate.

4. A composition as in claim 1 wherein A is a mixture of 2-hydroxypropyl acrylate and glycidyl methacrylate, B is maleic anhydride and C is a mixture of acrylonitrile, ethyl acrylate, methyl methacrylate and cyclohexyl methacrylate.

* * * * *